UNITED STATES PATENT OFFICE.

ADOLF DIECKERHOFF, OF VIENNA, AUSTRIA.

IMPROVEMENT IN EXPLOSIVE COMPOUNDS.

Specification forming part of Letters Patent No. 178,277, dated June 6, 1876; application filed February 1, 1876.

*To all whom it may concern:*

Be it known that I, ADOLF DIECKERHOFF, of Vienna, Austria, have invented certain new and useful Improvements in Explosive Compounds; and I do hereby declare that the following is a full and exact description thereof:

This invention of improvements in explosive compounds consists in a mixture of picric acid, nitrate of potash, nitrate of soda, flour of sulphur, and sawdust, (of oak or other hard wood,) and is manufactured in the following manner:

Take one pound each of picric acid and nitrate of potash and dissolve them in seventy-two pounds of boiling water; then take thirty pounds of sawdust and impregnate it with this solution; after it has thoroughly absorbed the liquid, dry it till every vestige of damp has been driven out. To every twenty pounds of this impregnated sawdust add thirty-five pounds of nitrate of potash, thirty-five pounds of nitrate of soda, and fifteen pounds of flour of sulphur; mix these ingredients thoroughly with the sawdust, and the explosive substance is finished and ready for use.

As all the ingredients used in the above manufacture require to be reduced to a fine powder, my compound, when in a finished state, is like meal or flour. It can, however, either be granulated or made into small sticks or bars, and is thus easier and handier for use.

The process for granulating the compound, or for converting it into sticks, is as follows:

After the sawdust has been impregnated, as above described, it is not allowed to dry, but is mixed with the three last ingredients above mentioned in a thoroughly damp state, and it is then either pounded for about an hour in a wooden stamping-trough, or ground in a mill. During this operation great care has to be taken that the dough be kept sufficiently damp—that is, not be allowed to become anywise dry. After having been thus pounded or ground, the dough is either granulated by being passed through sieves, or pressed into sticks by means of a hand-press. After having been dried, it is then ready for use.

I claim as my invention—

1. The explosive compound described, composed of sawdust, saturated with a solution of picric acid and nitrate of potash, dissolved in boiling water, then desiccated, and afterward mixed with nitrate of potash, nitrate of soda, and sulphur, all as set forth.

2. The described process for granulating or for converting into sticks the compound of sawdust, picric acid, nitrate of potash, nitrate of soda, and sulphur, the same consisting in mixing nitrate of potash, nitrate of soda, and flour of sulphur with sawdust previously saturated with picric acid and nitrate of potash, and while it is in a damp state passing it through sieves for granulating, or through a press to form sticks.

ADOLF DIECKERHOFF.

Witnesses:
JOHN B. WYATT,
OTTO REUTTER.